United States Patent [19]

Klein et al.

[11] 4,098,499

[45] Jul. 4, 1978

[54] VACUUM CASTING HEADS AND CLAMPS

[75] Inventors: H. Joseph Klein; William C. Hord; James C. Ailor; Sankar P. Iyer, all of Kokomo, Ind.

[73] Assignee: Cabot Corporation, Kokomo, Ind.

[21] Appl. No.: 820,860

[22] Filed: Aug. 1, 1977

[51] Int. Cl.² .............................................. B23Q 3/00
[52] U.S. Cl. ........................................ 269/22; 269/21
[58] Field of Search .................... 269/20, 21, 22, 287; 279/2 A, 3

[56] References Cited

U.S. PATENT DOCUMENTS 3,844,546  10/1974  Greenberg ......................... 269/287

FOREIGN PATENT DOCUMENTS 1,125,836  10/1958  Fed. Rep. of Germany ......... 269/22

Primary Examiner—Robert C. Watson
Attorney, Agent, or Firm—Jack Schuman; Joseph J. Phillips; Eugene F. Buell

[57] ABSTRACT

A casting head and clamp arrangement for vacuum aspiration casting of metal rods in glass tubes is provided having a casting head with a generally vertical vacuum passage, a removable fluid pressure chuck in the lower end of said vacuum passage adapted to receive and hold the end of a glass tube, said chuck including a pair of spaced annular support discs, spaced elongate members connecting said support discs, sleeve members having an internal diameter larger than a glass tube to be held fixed on each of support disc annulus and projecting beyond said discs between the elongate members, an elastomer tube fixed at its opposite ends to the sleeve members and having an internal diameter larger than the diameter of the glass tube to be held and fluid pressure means acting between said discs to cause the elastomer tube to decrease in effective internal diameter under pressure to engage and hold the glass tube ends and to release the tube ends when the fluid pressure is released.

10 Claims, 4 Drawing Figures

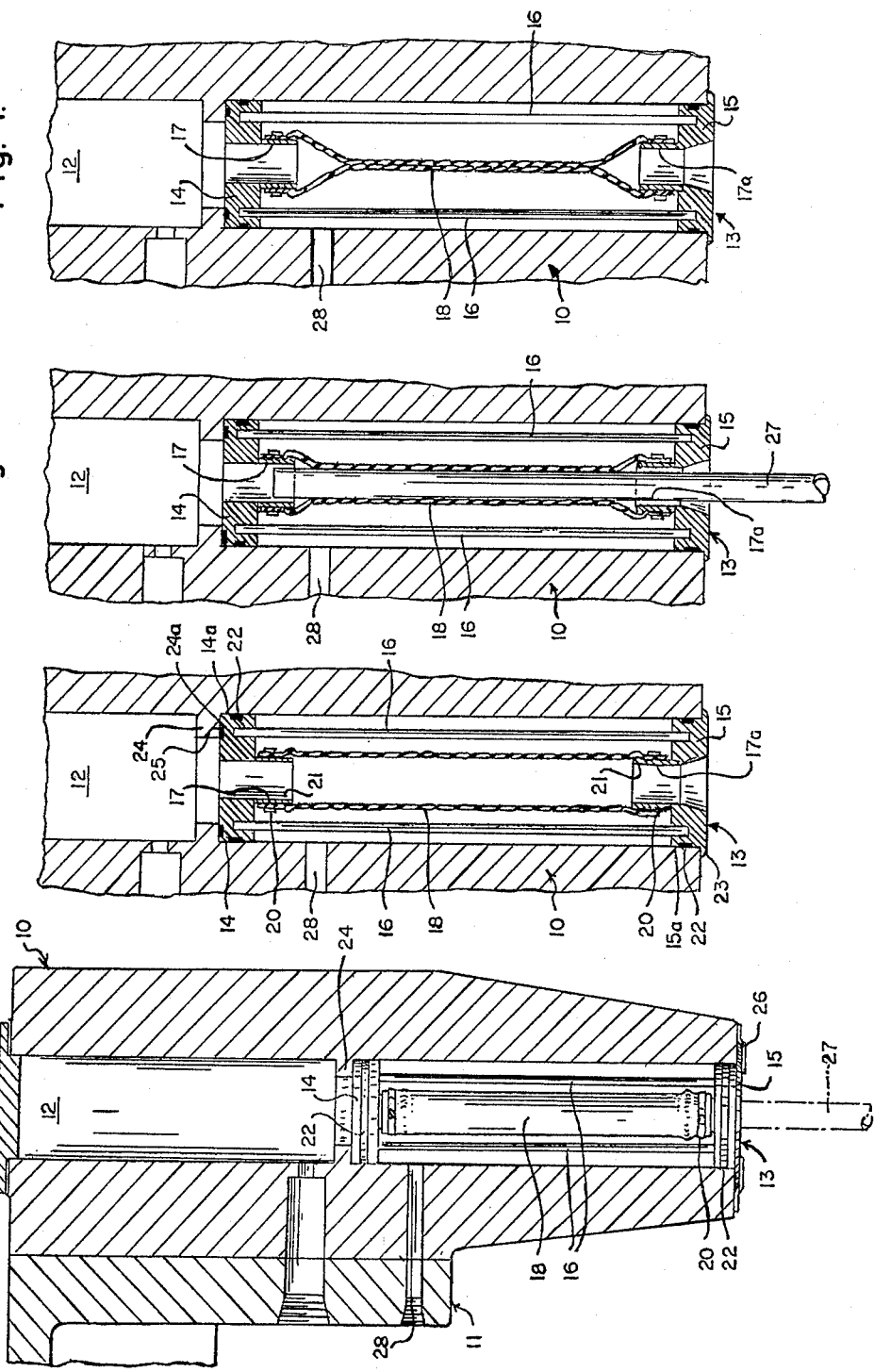

VACUUM CASTING HEADS AND CLAMPS

This invention relates to vacuum casting heads and clamps and particularly to vacuum aspiration casting heads and clamps or chucks for aspiration casting of metal welding electrodes and the like.

The practice of aspiration casting of metal welding electrodes by drawing or aspirating molten metal into glass tubes under vacuum is known. There are, however, numerous problems in aspiration casting of such electrodes. Among these problems are the chucking and holding one end of the glass tube which is placed under vacuum while the opposite end is inserted in a molten bath of metal. There has been proposed a vacuum operated clamp in which an elastomer tube having an internal diameter smaller than the glass tube to be clamped is enlarged by evacuating the area around the elastomer tube while the glass tube is inserted and the vacuum released to permit the tube to retract around the glass tube. However, when there are multiple casting heads involved, there is no vacuum seal when there is no glass tube in one of the heads. This is most undesirable. Similarly a minute rupture in the rubber tubing will seriously affect the glass loading and/or sealing of the tubes, which is also undesirable.

It is essential that the chucking means act rapidly and positively to engage and release the glass tube end as is desired. It is also essential, where multiple vacuum casting heads are involved, that if a glass tube is missed on insertion, that the missed head be sealed. The present invention provides a solution to all of these problems.

We provide a casting head having a generally vertical vacuum passage and a removable chuck in said vacuum passage, said chuck including a pair of spaced annular support discs, spaced elongate members connecting said support discs, sleeve members having an internal diameter larger than the glass to be held fixed in the support disc annuli and projecting axially from said discs toward each other, an elastomer tube fixed at each end to the sleeve member, and having an internal diameter of the glass tube to be held and pressure means acting between the support discs on the elastomer tube to compress the tube radially inwardly to grip a glass tube end inserted therein or to completely compress the tube to seal the elastomer tube if a glass tube fails to pick up, falls out or otherwise leaves the tube open. Preferably the elastomer tube is a surgical rubber tube. The support discs are preferably provided with O-ring seals to seal the chuck in the vacuum passage.

In the foregoing general description of our invention we have set out certain objects, purposes and advantages of our invention. Other objects, purposes and advantages of this invention will be apparent from the following description and the accompanying drawings in which:

FIG. 1 is a fragmentary section through a multiple head vacuum aspiration casting head incorporating the present invention;

FIG. 2 is a section through a fragment of a vacuum head of FIG. 1 showing the chuck prior to glass loading;

FIG. 3 is a section on the same line as FIG. 2 with the glass loaded in the chuck; and FIG. 4 is a section on the same line as FIG. 2 with the chuck closed when no glass is loaded.

Referring to the drawings we have illustrated one casting head 10 of a multiple assembly of such heads depending from a carrier 11 and having an axial vacuum passage 12 connected to a vacuum source, not shown, for providing the vacuum for evacuating a glass tube for aspiration casting of metal. A clamp mechanism 13 is inserted in the lower end of passage 12. The clamp mechanism is made up of an upper support annulus 14 and a lower support annulus 15 connected by elongated rods 16. Each of the support annuli 14 and 15 are provided with tube sleeves 17 and 17a respectively extending axially toward each other. A surgical rubber tube 18 extends between sleeves 17 and 17a in the unstretched condition and held there by clamps 20. Preferably the tube sleeves are provided with radial holding rings 21. Each of the upper and lower annulus discs 14 and 15 is provided with a groove 14a and 15a carrying an O-ring seal 22. The lower annulus 15 preferably has a radial stop flange 23 abutting the lower end of casting head 10. Collar means 24 may be inserted in passage 12 to aid holding and sealing the chuck means in position. In this case and annular groove 24a is formed in the top of upper annulus 14 to carry O-ring 25. A plurality of chuck holders 26 are provided on the casting head 10 to hold the chuck in place.

The operation of this casting head and chuck is as follows. A glass tube 27 is inserted into tube 18 through sleeves 17 and 17a with the tubing 18 in the position shown in FIG. 3. Air pressure is introduced into the area between discs 14 and 15 through inlet 28 causing the tube 18 to tightly engage the glass tube end as shown in FIG. 3 after which vacuum is applied to passage 12 while the free end of glass tube 27 is inserted into a bath of molten metal causing the metal to rise in the glass tube. The tube is moved from the metal bath and the pressure in inlet 28 released, causing the glass tube and contained metal to drop free. In the event a glass tube fails to enter the tube 18, the air pressure closes the tube as in FIG. 4 to seal the passage and prevent loss of vacuum in other heads of the assembly.

While we have illustrated and described certain preferred embodiments and practices of our invention in the foregoing specification, it will be understood that this invention may be otherwise embodied within the scope of the following claims.

We claim:

1. A casting head and clamp arrangement for vacuum aspiration casting of metal rods in glass tubes comprising a casting head having a generally vertical vacuum passage, a removable fluid pressure chuck in the lower end of said vacuum passage adapted to receive and hold the end of a glass tube, said chuck including a pair of spaced annular support discs, spaced elongate members connecting said support discs, sleeve members having an internal diameter larger than a glass tube to be held fixed on each of support disc annulus and projecting beyond said discs between the elongate members, an elastomer tube fixed at its opposite ends to the sleeve members and having an internal diameter larger than the diameter of the glass tube to be held and fluid pressure means acting between said discs to cause the elastomer tube to decrease in internal diameter under pressure to engage and hold the glass tube ends and to release the tube ends when the fluid pressure is released.

2. A casting head and clamp arrangement as claimed in claim 1 wherein the elastomer tube is of surgical rubber.

3. A casting head and clamp arrangement as claimed in claim 1 wherein the elastomer tube is tension free between the two sleeves.

4. A casting head and clamp arrangement as claimed in claim 1 wherein the support discs are provided with circumferential grooves, having an O-ring seal engaging the wall of the vertical vacuum passage to seal the area between said discs.

5. A casting head and clamp arrangement as claimed in claim 1 wherein the lowermost disc has stop means abutting the lower end of the casting head to hold the chuck against being drawn into the vacuum passage.

6. A casting head and clamp arrangement as claimed in claim 5 wherein the stop means is a radial flange.

7. A fluid pressure clutch mechanism for holding the end of a glass tube or the like tubular object comprising a pair of spaced annular support discs, spaced elongated members connecting said discs, sleeve members having an internal diameter larger than a glass tube to be held fixed on each support disc members and projecting beyond said discs between the elongate members, an elastomer tube fixed at its opposite ends to the sleeve members and having an internal diameter larger than the diameter of the glass tube to be held and fluid pressure means acting between said discs to cause the elastomer tube to decrease in internal diameter under pressure to engage and hold the glass tube ends and when the pressure is released to release said glass ends.

8. A fluid pressure clutch mechanism as claimed in claim 7 wherein the elastomer tube is surgical rubber.

9. A fluid pressure clutch mechanism as claimed in claim 7 wherein the elastomer tube is tension free between the two sleeves.

10. A fluid pressure clutch mechanism as claimed in claim 7 wherein the sleeve means are integral with the support discs and each sleeve means has a radial holding ring.

* * * * *

UNITED STATES PATENT OFFICE
CERTIFICATE OF CORRECTION

Patent No. 4,098,499  Dated July 4, 1978

Inventor(s) H. Joseph Klein, William C. Hord, James C. Ailor and Sankar P. Iyer

It is certified that error appears in the above-identified patent and that said Letters Patent are hereby corrected as shown below:

Column 2, line 20, "and" should be --an--.

Column 2, line 27, "FIG. 3" should be --FIG. 2--.

Signed and Sealed this

Nineteenth Day of December 1978

[SEAL]

Attest:

RUTH C. MASON
Attesting Officer

DONALD W. BANNER
Commissioner of Patents and Trademarks